United States Patent [19]

Chang

[11] Patent Number: 4,833,448

[45] Date of Patent: May 23, 1989

[54] WARNING DEVICE TO ALERT PASSERS-BY BEFORE OPENING AN AUTOMOBILE DOOR

[76] Inventor: Jih-Cheng Chang, 3Fl., No. 4, Lane 244, Hsing Lung Road, Sec. 2, Chin Mei, Taipei, Taiwan

[21] Appl. No.: 206,295

[22] Filed: Jun. 14, 1988

Related U.S. Application Data

[63] Continuation-in-part of Ser. No. 106,503, Oct. 9, 1987, abandoned.

[51] Int. Cl.$^4$ ............................................. B60Q 1/00
[52] U.S. Cl. ................................ 340/425.5; 340/468; 307/10.8
[58] Field of Search ............... 340/52 R, 52 D, 63, 340/84, 542; 307/10 LS

[56] References Cited

FOREIGN PATENT DOCUMENTS 2836767  9/1979  Fed. Rep. of Germany ... 340/52 D
 221735  6/1982  Japan ................................... 340/542

Primary Examiner—Joseph A. Orsino
Assistant Examiner—Jeffery A. Hofsass
Attorney, Agent, or Firm—Leonard Bloom

[57] ABSTRACT

A warning device for alerting passers-by, particularly oncoming motorists, before opening an automobile door will be installed on an automobile to produce a warning sign visible by passers-by. The device includes a door lock for locking and unlocking an automobile door, a door lock switch operable in association with the door lock, a relay operable by the door lock switch to turn on warning lights installed at the front end and rear end of the automobile, and a blinker for causing the warning lights to blink.

1 Claim, 4 Drawing Sheets

WARNING DEVICE TO ALERT PASSERS-BY BEFORE OPENING AN AUTOMOBILE DOOR

This application is a continuation-in-part of U.S. patent application No. 07/106,503 filed on Oct. 9, 1987 now abandoned.

BACKGROUND OF THE INVENTION

This invention relates to a warning device to alert passers-by before opening an automobile door, and more particularly a warning device to be installed in an automobile to produce a visible sign or a well-known sign to alert passers-by particularly oncoming motorists, before opening the door.

Modern automobiles are equipped with several warning devices such as turn signals which warn passers-by of the intention to turn the automobile in a direction, and door warning lights which alert the driver when an automobile door has been improperly closed or unlocked. However, there has not been a proper means for warning passers-by of an intention to open an automobile door before the driver or the occupants of the automobile get out of the automobile. Therefore it often happens on the roadside that when one, being unaware of passers-by, wants to get out of an automobile and opens an automobile door, the door swinging open from the automobile obstructs the passing of the passers-by and causes a collision. Such accidents can be prevented if a proper warning is given to the passers-by before the automobile door is opened.

The inventor is aware of U.S. Pat. No. 3,735,833 and Japanese laid open Patent No. 58-221735. In U.S. Pat. No. 3,735,833 a theft prevention device is disclosed; such a device includes a switch controlled through a door lock to activate appropriate circuits to open the ignition circuit when the door is unlocked. In Japanese laid open Patent No. 58-221735 an unlock warning unit is disclosed; such an unlock warning unit includes unlock detecting switches which are turned on in an unlock condition to light a warning lamp when the car's ignition switch is turned on. However, neither one suggests or teaches a warning device to alert passers-by before opening an automobile door.

Therefore it is primary object of this invention to offer a warning device to alert passers-by before opening an automobile door so as to prevent avoidable car accidents.

SUMMARY OF THE INVENTION

The warning device of this invention includes a door lock switch operable in association with a door lock of an automobile, and a relay operable by the door lock switch to turn on warning lights mounted on the front end and rear end of the automobile. The relay is provided with a blinker which causes the warning lights to blink, or to flash continuously. When the door is locked, the door lock switch is caused to open and the relay is de-energized, and thus the warning lights are turned off. When the door lock is unlocked as the occupant of the automobile intends to get out of the automobile, the door lock switch is caused to close (i.e., the door lock switch is turned on) and the relay is activated (or energized), and the warning lights are turned on accordingly to alert passers-by that the door is being opened.

BRIEF DESCRIPTION OF THE DRAWINGS

FIG. 2 is an electrical wiring diagram of the warning device of FIG. 1, with the door lock unlocked and the warning lights turned on.

DETAILED DESCRIPTION OF THE INVENTION

Figure 1:
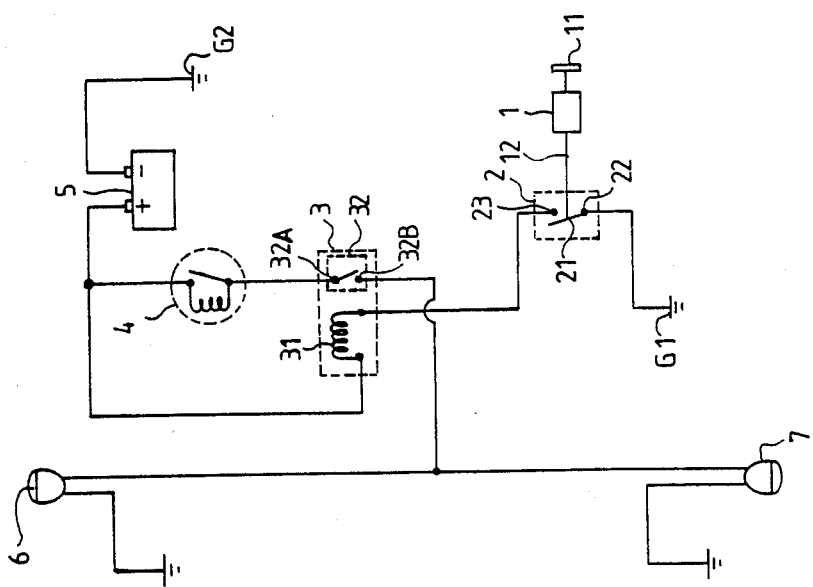
FIG. 1 is an electrical wiring diagram showing a first embodiment of the warning device of this invention, with the door lock locked and the warning lights turned off.

As shown in FIG. 1, the first embodiment of the warning device of this invention includes a door lock 1 for an automobile door, a door lock switch 2 operable in association with door lock 1, a relay 3 operable in connection with door lock switch 2, and warning lights 6, 7 and blinker 4 which are turned on when relay 3 is energized. Door lock 1 has an operating knob 11 adapted to operate the door lock 1 by an occupant of the automobile, and a stem 12 operatively connected to operating knob 11. Door lock switch 2 has a contact arm 21 operatively connected to stem 12, a first contact point 22 connected to ground G1 which may be a door structure of the automobile, and a second contact point 23 to correspond with first contact point 22. Relay 3 has a solenoid 31 having one end connected to second contact point 23 of door switch 2 and another end connected to the positive pole of a battery 5 having a negative pole connected to ground G2, and a relay switch 32 operable by solenoid 31. Relay switch 32 has a first contact point 32A connected with positive pole of battery 5 through a blinker 4, and a second contact point 32B connected with warning light 6 mounted on the front end of the automobile and another warning light 7 mounted on the rear end of the automobile. When solenoid 31 is energized, relay switch 32 is caused to close first contace point 32A and second contact point 32B. When solenoid 31 is de-energized, relay switch 32 is caused to open first contact point 32A and second contact point 32B. Blinker 4 is adapted to cause warning lights 6 and 7 to blink or flash continuously when relay switch 32 is turned on.

When a door having door lock 1 is locked, operating knob 11 is pushed in and stem 12 is caused to extend from door lock 1 so as to open door lock switch 2 as shown in FIG. 1, and solenoid 31 is de-energized. Relay switch 32 is thus caused to open and warning lights 6 and 7 are turned off.

Figure 2:
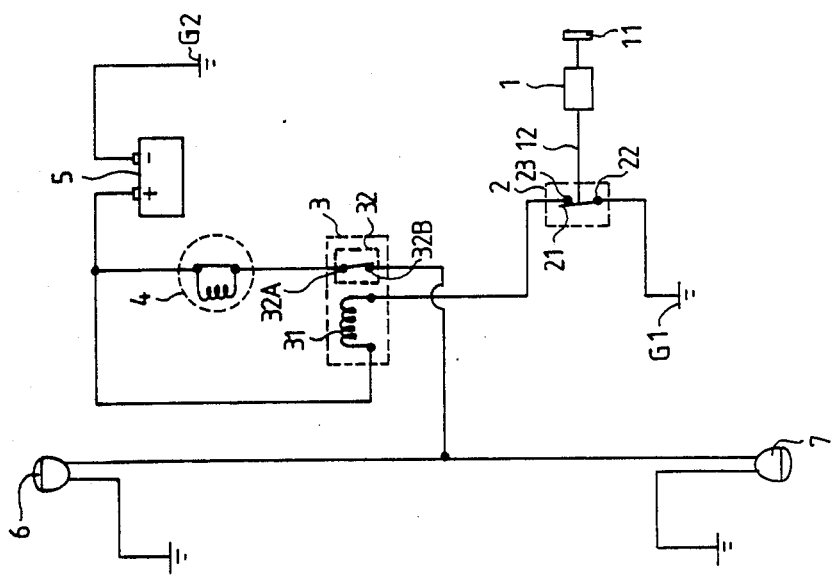

When door lock 1 is unlocked by pulling operating knob 11, stem 12 is pulled towards door lock 1 so as to close door lock switch 2, as shown in FIG. 2, and solenoid 31 is energized to close relay switch 32; as a result power is supplied to warning lights 6 and 7 through blinker 4 to cause warning lights 6 and 7 to blink, and the passers-by may be warned of the intended opening of the door.

Figure 3:
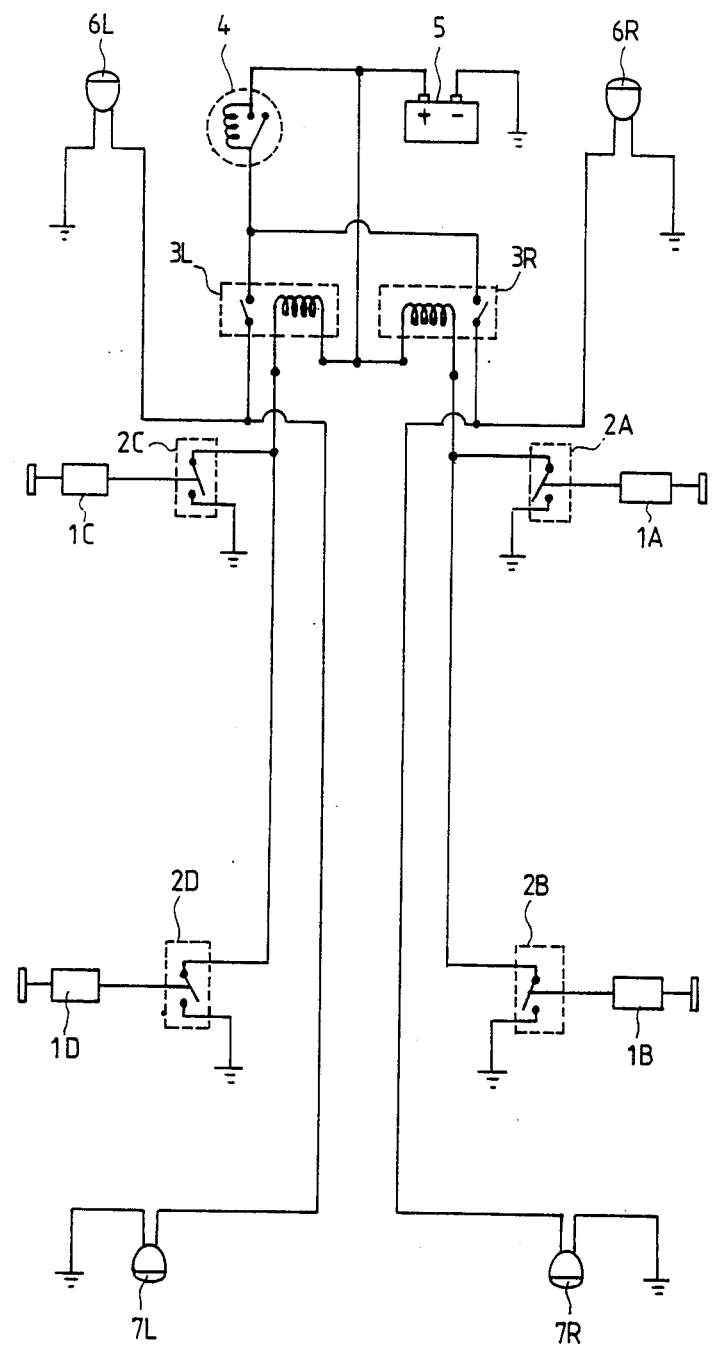
FIG. 3 is an electrical wiring diagram of a system employing the warning device of FIG. 1 in a four-door automobile.

FIG. 3 shows an arrangement of the warning device of the above described first embodiment of this invention in a four-door automobile. In this arrangement each one of the four doors, not shown, is equiped with a door lock 1A, 1B, 1C or 1D, and a door lock switch 2A, 2B, 2C or 2D operable in association with respective door lock 1A, 1B 1C or 1D. The two door lock switches 2A and 2B on the right side of the automobile are connected in parallel and provided with one relay 3R for controlling right side warning lights 6R and 7R, and the other two door lock switches 2C and 2D at the left side of the automobile are connected in parallel and provided with another relay 3L for controlling left side warning lights 6L and 7L. One blinker 4 is used in common for two relays 3R and 3L. When either one of the two door locks 1A and 1B on the right side of the automobile is unlocked, right side warning lights 6R and 7R are caused to blink. In the same manner when either one of two door locks 1C and 1D on the left side of the automobile is unlocked, left side warning lights are caused to blink. Therefore, the passers-by will be given a correct sign indicating on which side of the automobile the door is being opened.

Blinker 4 may be a conventional device for causing automobile turn signal lights to blink, therefore its construction and operating principles will not be described.

Figure 4:
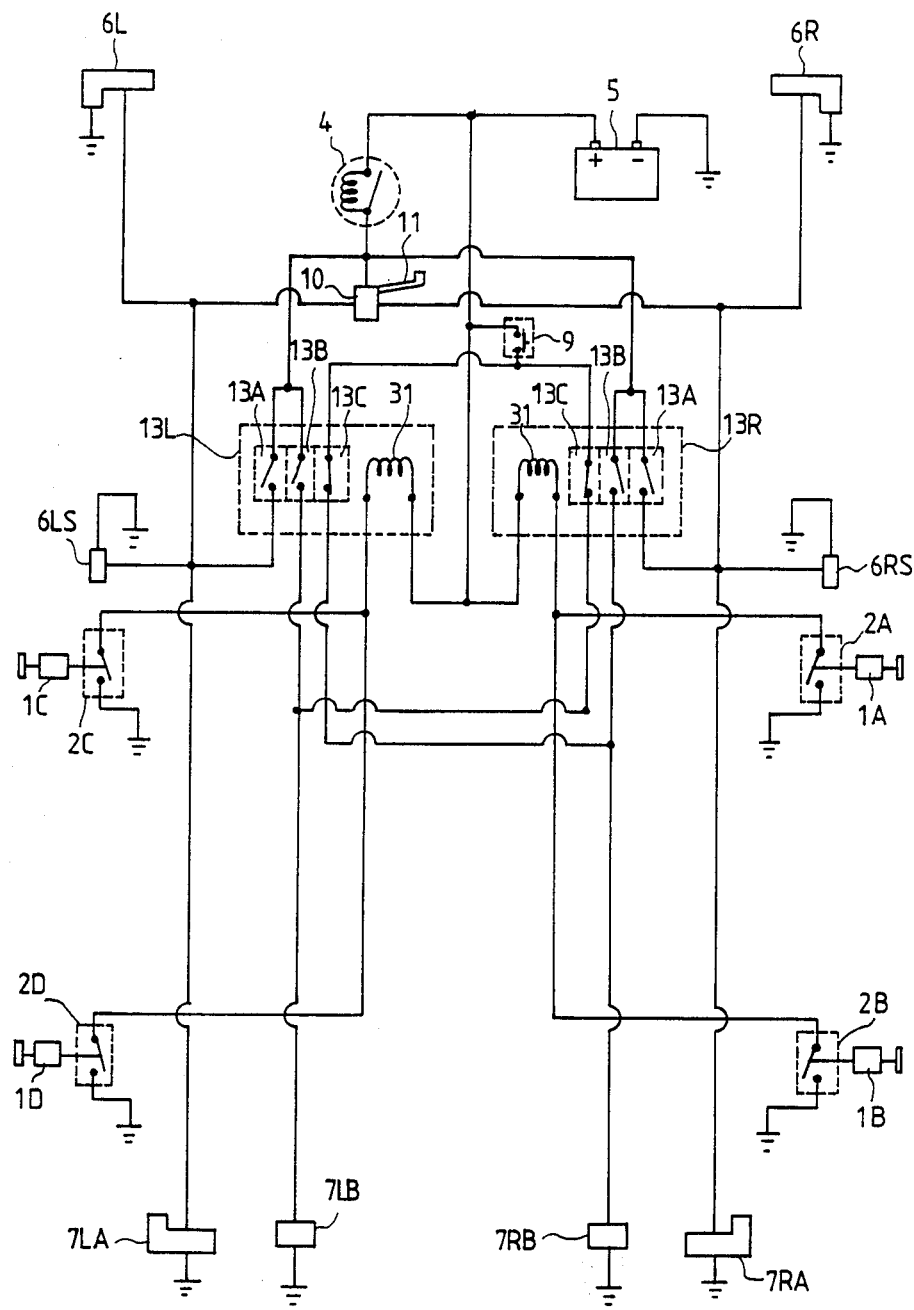
FIG. 4 is an electrical wiring diagram showing a second embodiment of the warning device of this invention, with all doors locked.

FIG. 4 shows a second embodiment of the warning device of this invention installed in a four door automobile by way of example. In this embodiment, the warning device includes a right side door lock 1A or 1B installed on each one of right side doors, not shown, a right side door lock switch 2A or 2B operable in association with right side door lock 1A or 1B, a left side door lock 1C or 1D installed on each one of left side doors, not shown, a left side door lock switch 2C or 2D operable in association with left side door lock 1C or 1D, right side turn signal lights 6R, 6RS and 7RA, right side brake light 7RB, a right side relay 13R, a left side turn signal lights 6L, 6LS, and 7L, a left side brake light 7LA, and a left side relay 13L. Each one of right side relay 13R and left side relay 13L has a solenoid 31, a first switch 13A, second switch 13B, and a third switch 13C; when solenoid 31 is de-energized, first switch 13A and second switch 13B are caused to open, and third switch 13C is caused to close, and when solenoid 31 is energized, first switch 13A and second switch 13B are caused to close and third switch is caused to open.

Each one of door locks 1A, 1B, 1C and 1D has the same construction as that of the first embodiment.

It should be understood that right side turn signal lights 6R, 6RS and 7RA are respectively mounted on the right-front end, right-side part, and right-rear end of the automobile, and left side turn signal lights 6L, 6LS and 7LA are respectively mounted on the left-front end, left-side part, and left-rear end of the automobile. It should also be understood that right side brake light 7RB is mounted on the right-rear end of the automobile, and left side brake light 7LB is mounted on the left-rear end of the automobile.

Right side door lock switches 2A and 2B are connected in parallel and are further connected to a positive pole of battery 5 through solenoid 31 of right side relay 13R, battery 5 having a negative pole connected to ground. Right side turn signal lights 6R, 6RS and 7RA are connected in parallel and further connected to positive pole of battery 5 through first switch 13A of right side relay 13R and a blinker 4. Right side brake light 6RB is connected to positive pole of battery 5 by two parallel routes of which one is a series connection of second switch 13B of right side relay 13R and blinker 4, and another is a series connection of third switch 13C of left side relay 13L and a brake light switch 9.

Similary, left side door lock switches 2C and 2D are connected in parallel and are further connected to a positive pole of battery 5 through solenoid 31 of left side relay 13L. Left side turn signal lights 6L, 6LS and 7LA are connected in parallel and are further connected positive pole of battery 5 through first switch 13A of left side relay 13L and blinker 4. Left side brake light 7LB is connected to positive pole of battery 5 by two parallel routes, of which one is a series connection of second switch 13B of left side relay 13L and blinker 4, and another is a series connection of third switch 13C of right side relay 13R and brake light switch 9.

Right side turn signal lights 6R, 6RS and 7RA, and left side turn signal lights 6L, 6LS and 7LA are also connected to positive pole of battery 5 through turn signal switch 10 and blinker 4, turn signal switch 10 being operable with a turn signal operating lever 11.

Door lock switches 2A, 2B, 2C and 2D are open when door locks 1A, 1B, 1C and 1D are locked, as shown in FIG. 4, and solenoids 31, 31 of right side relay 13R and left side relay 13L are de-energized, causing first switches 13A, 13A and second switches 13B, 13B of the two relays 13R, 13L to open and third switches 13C, 13C of the two relays 13R, 13L to close. Then turn signal lights 6R, 6RS, 7RA, 6L, 6LS and 7LA are turned off but can be turned on by operating turn signal control switch 10 which is operable by turn signal operating lever 11. At the same time right side brake light 7RB and left side brake light 7LB are turned off but can be turned on by operating brake light switch 9.

Figure 5:
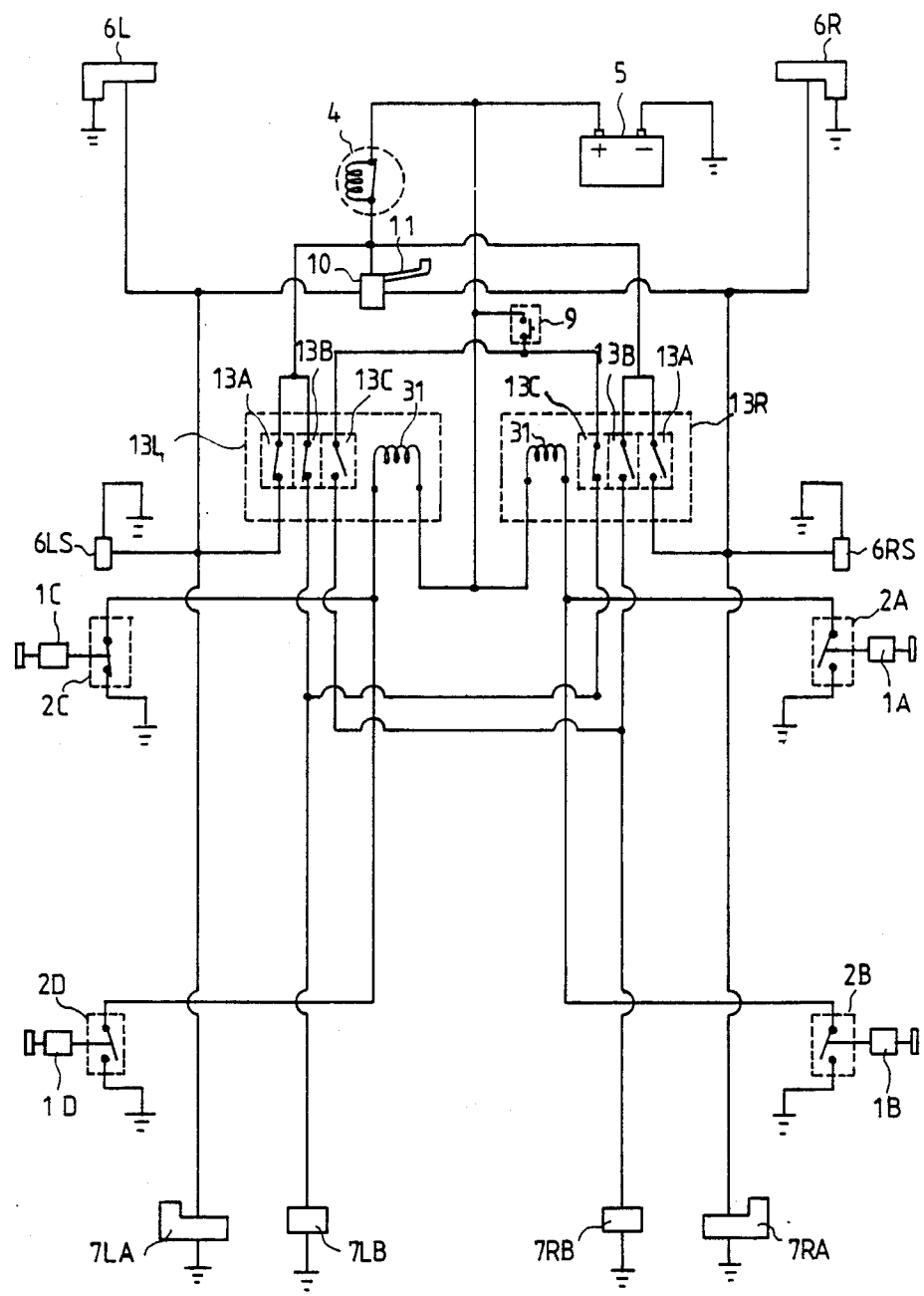
FIG. 5 is an electrical wiring diagram of the warning device of FIG. 4, with one door lock unlocked.

When one of the four door locks 1A, 1B, 1C and 1D is unlocked as the driver of the automobile intends to get out of the automobile, a left side front door lock 1C is unlocked, as shown in FIG. 5, and the corresponding door lock switch 2C is closed (i.e., turned on). Then solenoid 31 of left side relay 13L is energized to cause first switch 13A and second switch 13B of left side relay 13L to close, and third switch 13C of the same relay to open. As a result power is supplied from battery 5 through blinker 4 and first switch 13A of left side relay 13L to left side turn signals 6L, 6LB and 7LA, and also through blinker 4 and second switch 13B of the same relay 13L to left side brake light 7LB, causing left side turn signal lights 6L, 6LS and 7LA, and left side brake light 7LB to blink, while right side turn signal rights 6R, 6RS and 7RA remain operable by turn signal switch 10, and right side brake light 7RA becomes inoperative by brake light switch 9 until the left side front door lock 1C is locked again. And the passers-by are warned of the intended opening of the door on the left side of the automobile.

Following the same principles, when one of the two right side door locks 1A and 1B are unlocked as the occupant of the automobile intends to get out of the automobile, right side turn signal lights 6R, 6RS and 7RA, and right side brake light 7RB are caused to blink. And the passers-by are warned of the intended opening of the door on the right side of the automobile.

It is to be understood that relay 13R or 13C can be replaced by an IC device or an inverter having three switching elements to perform the same functions of first switch 13A, second switch 13B, and third switch 13C.

According to the warning device of this invention the door lock switch adapted to be operated by the door lock assures that the warning lights are turned on before the door is open. When a locked door is to be opened, one must first unlock the door lock, and then release the door latch before the door can be opened. Such a process requires a minimum of two seconds according to an observation by the inventor. In other words, there is a time delay of a minimum of two seconds after the door lock is unlocked to turn on the warning lights until the door is opened. Such a two second delay enables passers-by to alert themselves before they are obstructed by the opening door.

It is also to be understood that the warning device of this invention can be installed in an automobile as standard equipment to be built in at the automobile manufacturer's shop, or as an option to be added by the car dealers or by the owner of the automobile himself.

I claim:

1. A warning device to alert passers-by before opening an automobile door, comprising:
   (a) right side turn signal lights and left side turn signal lights connected to a battery through a turn signal control switch and a blinker;
   (b) a right side brake light and a left side brake light;
   (c) a right side door lock installed on a right side door of the automobile;
   (d) a left side door lock installed on a left side door of the automobile;
   (e) a right side door lock switch operable in association with said right side door lock to be turned on when said right side door lock is unlocked;
   (f) a left side door lock switch operable in association with said left side door lock to be turned on when said left side door lock is unlocked;
   (g) a right side relay and a left side relay, each one of said right side relay and left side relay having a first switch, a second switch, a third switch, and a solenoid for operating said first switch, second switch and third switch in such a manner that when said solenoid is deenergized, said first switch and second switch are caused to open and said third switch is caused to close, and when said solenoid is energized, said first switch and second switch are caused to close and said third switch is caused to open; said solenoid of said right side relay being electrically operable by said right side door lock switch, and said solenoid of said left side relay being electrically operable by said left side door lock switch;

wherein said right side turn signal lights are connected to said battery through said first switch of said right side relay and said blinker; said right side brake light is connected to said battery through two parallel routes of which one is a series connection of said second switch of said right side relay and said blinker, and another is a series connection of said third switch of said left side relay and a brake light switch; and said left side turn signal lights are connected to said battery through said first switch of said left side relay and said blinker; said left side brake light is connected to said battery through two parallel routes of which one is a series connection of said second switch of said left side relay and said blinker, and another is a series connection of said third switch of said right side relay and said brake light switch.

* * * * *